(12) United States Patent
Tirella et al.

(10) Patent No.: US 10,880,616 B2
(45) Date of Patent: Dec. 29, 2020

(54) SYSTEMS AND METHODS FOR QUALITY-OF-EXPERIENCE DRIVEN IN-TRANSPORT COMMUNICATIONS

(71) Applicant: ViaSat, Inc., Carlsbad, CA (US)

(72) Inventors: Andrew D. Tirella, Cambridge, MA (US); Gina C. Tuazon-Ayache, San Diego, CA (US); Shreyas S. Vidyarthi, San Diego, CA (US); Nobuo Fukaya, Carlsbad, CA (US); Kevin B. Rennie, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 207 days.

(21) Appl. No.: 16/146,673

(22) Filed: Sep. 28, 2018

(65) Prior Publication Data

US 2020/0107081 A1  Apr. 2, 2020

(51) Int. Cl.
  *H04N 7/18* (2006.01)
  *H04N 21/647* (2011.01)
  *H04L 29/08* (2006.01)

(52) U.S. Cl.
  CPC ..... *H04N 21/64738* (2013.01); *H04L 67/322* (2013.01)

(58) Field of Classification Search
  CPC ..... H04W 24/08; H04W 24/02; H04W 24/10; H04W 4/40; H04L 67/12; H04L 41/5067;
  (Continued)

(56) References Cited

U.S. PATENT DOCUMENTS

| 9,037,699 B1 * | 5/2015 | Bordner-Babayigit ..................... H04L 25/0262 709/224 |
| 2009/0034426 A1 * | 2/2009 | Luft ...................... H04L 41/509 370/252 |

(Continued)

FOREIGN PATENT DOCUMENTS

| EP | 2530870 A1 | 12/2012 |
| EP | 2811719 A1 | 12/2014 |
| WO | 2016133818 A1 | 8/2016 |

OTHER PUBLICATIONS

International Search Report and Written Opinion in related Application No. PCT/US2019/053110 dated Nov. 26, 2019.

*Primary Examiner* — Jason Salce
(74) *Attorney, Agent, or Firm* — Holzer Patel Drennan

(57) ABSTRACT

Approaches are described for providing quality of experience (QoE) driven in-transport communications services. For example, in-transit communications services are provided over a network to content consumption devices on one or more transport craft. During a measurement window, delivery of the in-transit communications services can be measured to obtain network-level delivery (NLD) measurements, and consumption of the in-transit communications services by one or more of the content consumption devices can be measured to obtain customer-level consumption (CLC) measurements. The NLD and CLC measurements can be used to compute a QoE score that indicates a delivered quality of service as perceived by one or more passengers of the one or more transport craft. The QoE score can be used to update stored service level data. The update can cause generation of one or more service level triggers, which can trigger automatic remedial action to address QoE-related conditions.

30 Claims, 5 Drawing Sheets

(58) Field of Classification Search
CPC ... H04L 41/5009; H04L 43/16; H04L 5/1446; H04N 21/2402; H04N 21/2662
See application file for complete search history.

(56) References Cited

U.S. PATENT DOCUMENTS

| | | | |
|---|---|---|---|
| 2013/0133011 A1* | 5/2013 | Chhaochharia | H04L 47/25 725/62 |
| 2016/0105821 A1* | 4/2016 | Senarath | H04W 76/00 370/329 |
| 2019/0116535 A1* | 4/2019 | Szilagyi | H04L 43/0864 |

* cited by examiner

SYSTEMS AND METHODS FOR QUALITY-OF-EXPERIENCE DRIVEN IN-TRANSPORT COMMUNICATIONS

FIELD

Embodiments relate generally to communications systems, and, more particularly, to providing quality of experience driven communications services to in-transit transport craft via communications systems.

BACKGROUND

Residential or business customers of communications and content services typically enter into relatively long-term (e.g., monthly, yearly, etc.) contractual relationships with providers of those services, such as with Internet service providers, television service providers, over-the-top media service providers, and others. Those customers generally expect a certain contracted level of service; and when those customers experience an undesirable level of service, they are often motivated to contact the service provider to report the undesirable level of service. For example, frustrated customers can be likely to contact their Internet service provider whenever there is a service outage, an appreciable slow-down, configuration issues, etc. To help ensure a desirable experience for their customers, such service providers typically encourage their customers to report issues and work to address those issues in a timely fashion.

It is becoming more common for users to desire to consume communications resources (e.g., for streaming media, email, Internet, etc.) while in transit on a transport craft. For example, passengers may bring mobile phones, laptop computers, tablet computers, integrated media terminals, and/or other in-transport terminals while travelling by car, airplane, bus, train, cruise ship, or other transport craft. In many cases, some or all of the communications services are provided to the passengers via a remote network (e.g., Internet) in communication with the transport craft. In such cases, there is often contractual relationship between a communications provider and the transportation provider that operates the transport craft. To help ensure a particular level of service is being provided by the communications provider, some such providers tend periodically to check that their services are available for a percentage of time and/or are satisfying some contracted data rate threshold.

While there is often a relatively long-term contractual relationship between the communications provider and the transportation provider, there may only be a relatively short-term relationship between the communications provider and the passengers. For example, a passenger of an airline may only use that airline's Internet service for part of the duration of a single flight. During that time, though the service may be technically available and providing at least a minimum data rate to the airplane, the passenger may still experience poor, or no, service for a number of reasons. As such, both the transportation providers and the communications providers may have an incomplete understanding of end users' experiences, which can tend to frustrate the ability of those providers to become aware of, and to properly address, issues arising with regard to those end users' experiences.

BRIEF SUMMARY

Among other things, systems and methods are described for providing quality of experience (QoE) driven in-transport communications services. For example, in-transit communications services are provided over a network to content consumption devices on one or more transport craft. During a measurement window, delivery of the in-transit communications services can be measured to obtain network-level delivery (NLD) measurements, and consumption of the in-transit communications services by one or more of the content consumption devices can be measured to obtain customer-level consumption (CLC) measurements. The NLD and CLC measurements can be used to compute a QoE score that indicates a delivered quality of service as perceived by one or more passengers of the one or more transport craft. The QoE score can be used to update stored service level data. The update can cause generation of one or more service level triggers, which can trigger automatic remedial action to address QoE-related conditions.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Figure 1:
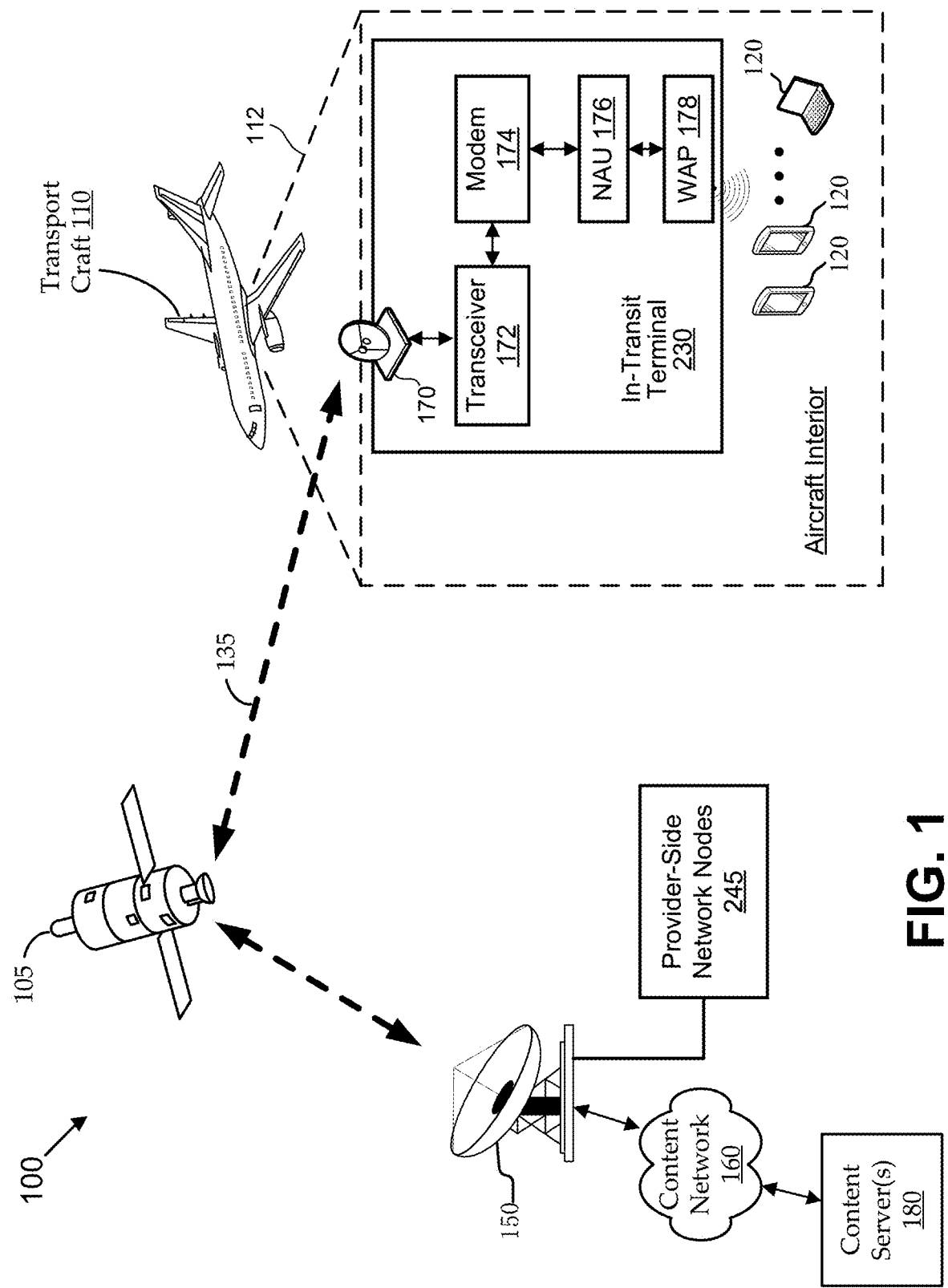
FIG. 1 shows a simplified diagram of a satellite communications system, which provides a context for various embodiments.

FIG. 1 shows a simplified diagram of a satellite communications system 100, which provides a context for various embodiments. The satellite communications system 100 generally facilitates delivery of on-board content from one or more content sources to multiple transport craft 110 according to release-time based prioritization, as described herein. For example, a passenger aircraft can have an on-board system to provide in-transit communications services (e.g., in-flight entertainment, in-flight Internet connectivity, etc.) to passengers via in-seat, personal mobile, or other devices. While the passenger aircraft is in flight, its on-board system can be in communication with one or more carriers of the satellite communications system 100, by which the in-transit communications services can be delivered to the passengers.

The transport craft 110 and transport-related services can be provided to passengers by a transportation provider, such as an airline company; and the transportation provider can desire to provide a positive experience to its passengers with respect to in-transit communications services. To engender a positive passenger experience, transportation providers may seek to ensure that in-transit communications services are delivered to passengers at least with a desired level of availability (e.g., with little to no network downtime or other experienced losses of service), at a desired data rate (e.g., high enough throughput, bandwidth, etc. to support passenger uses), and with a desired level of accessibility (e.g., appropriate pricing, support for different applications and/or device types, etc.). The in-transit communications services can be provided by a communications provider, such as a satellite communications company, which can provide and operate some or all components of a provider network through which the in-transit communications services are provided. In some cases, the communications provider is wholly or partially affiliated with the transportation provider. In other cases, the communications provider is separate from the transportation provider. In such cases, a transportation provider can ensure a desirable passenger experience through contractual relationships with the communications provider.

Conventionally, ensuring a desirable passenger experience has tended to involve obligating the communications provider only to periodically check that their services are available for at least some contracted percentage of time and/or are satisfying some contracted data rate threshold. However, such periodic checks tend not to accurately reflect whether a desirable level of service is being provided to the end users (e.g., the passengers). For example, even though an objective measurement may indicate that the network on a particular aircraft flight at a particular time is available and is providing at least a minimum level of data rate, some other issue may cause some or all passengers on the flight to be having trouble connecting to the network, using certain applications, or otherwise having an undesirable passenger experience. Often, in such instances, in-transport crew members may have little opportunity or ability to address the issue, passengers may have little motivation to report the issue, and/or it may be difficult to determine any causes or remedies for the issue when it is reported (e.g., because the reporting individual has an incomplete understanding of the issue, because it may be impractical for technicians to debug the issue after the fact, etc.).

Embodiments described herein provide novel approaches to maintaining a desired quality of experience (QoE) with respect to delivering in-transit communications services. For example, components of the provider network are used to obtain network-level delivery (NLD) measurements and customer-level consumption (CLC) measurements over a measurement time window while in-transit communications services are being provided. A QoE score can be computed as a function (e.g., a weighted average, etc.) of the NLD measurements and the CLC measurements, and those measurements can be based on both objective and subjective metrics. The computed QoE score can indicate, in real time, a delivered quality of service (QoS) as perceived by one or more passengers of one or more transport craft. In some embodiments the QoE score can be used automatically to generate one or more service-level triggers, which can cause performance of one or more automated trigger response actions to at least partially address detected changes in QoE, as desired.

Embodiments can use many different types of metrics in many different ways. The NLD measurements generally include objective measurements indicating the network's effectiveness in delivering the in-transit communications services (e.g., irrespective of whether or how those delivered services are consumed by one or more passengers). The NLD measurements can be obtained at various levels, for example, across an entire network, across a sub-network, across one or more links of a network, etc. The CLC measurements generally include subjective measurements (and may also include objective measurements) indicating passengers' effectiveness in consuming the in-transit communications services. The CLC measurements can also be obtained at various levels, for example, for each individual passenger or for large or small groups of passengers, for one or more simulated content consumption devices, etc. The two types of measurements can reflect in different ways on a computed QoE. For example, although in-transit communications services are objectively being made available to a particular passenger (e.g., according to the NLD measurements), the CLC measurements may indicate that one or more passenger content consumption devices is experiencing difficulty due to poor wireless reception (or a poor wired interface) at the passenger's seat, technical limitations of the device, and/or for other reasons. Further, though certain CLC measurements may be objectively measured (e.g., by a passenger content consumption device or a simulated content consumption device), the objective measurement may be combined with, and or may contribute to, a subjective portion of a QoE score computation. For example, a CLC measurement may include an objective measure of a number of video buffering events over a measurement time window, which may be compared with a threshold number of video buffering events as part of computing the QoE score and/or as part of outputting a service level trigger (discussed below); and the threshold number of video buffering events may have been determined by subjectively measuring what number of video buffering events tends to have a negative impact on delivered QoS as perceived by passengers.

Depending on the particular metrics used, one or more types of QoE score can be computed and/or used for generating service-level triggers. In some implementations, a general QoE score is computed to indicate an overall perception of delivered QoS. In other implementations, a web browsing QoE score is computed to indicate a perception of delivered QoS in relation to using the in-transit communications services for normal web browsing behaviors. In some implementations, a video streaming QoE score is computed to indicate a perception of delivered QoS in relation to using the in-transit communications services for video streaming behaviors. Other implementations can compute other types of QoE scores to indicate a perception of delivered QoS in relation to using the in-transit communications services for other types of behaviors. Any of these types of QoE scores can be computed with respect to one or more passengers, one or more transport craft, one or more measurement time windows, and/or other suitable parameters.

These and other features can be provided using components of the provider network. As used herein, the provider network can include some or all of provider-side components, craft-side components, and provider network to communicatively couple the provider-side components with the craft-side components. The provider-side components can include one or more gateway terminals 150 and provider-side network nodes 245. In some cases, the provider-side components can also include one or more content networks 160, one or more content servers 180, and/or any other suitable components disposed remote from the transport craft 110. The craft-side components can include an on-board communication system 112, which can have an in-transit terminal 230 with any other suitable communications-related components disposed on the transport craft 110. The provider network can include communications links (e.g., satellite communications links 135), relays (e.g., satellites 105), and/or other any other suitable components disposed between the transport craft and the provider-side components.

The illustrated embodiment shows a transport craft 110 in communication with one or more content servers 180 via a satellite 105, one or more provider-side network nodes 245 (e.g., a gateway, core node, etc.), and a content network 160. While the communications system 100 is illustrated with the transport craft 110 as a single aircraft in communication with a satellite 105 via a spot beam 135, such illustration is not intended to be limiting, and embodiments can operate in many different contexts. For example, the communications system 100 can include one or more transport craft(s) 110 (e.g., airplanes, trains, buses, blimps, cruise ships, etc.) communicating via any one or more suitable communications architecture(s), including any suitable communications links, such as satellite communications systems, air-to-ground communication systems, hybrid satellite and air-to-ground communications systems, cellular communications systems, etc.

Typically, because of the mobile nature of the transport craft 110, the communications architecture will likely involve at least one wireless communications link. In some embodiments, the transport craft(s) 110 can be in communication with communications systems having multiple carriers. The term "carrier" is used generally to include a wireless communications link by which one or more transport craft 110 and/or content consumption devices 120 can be serviced, such as a spot beam 135 of a satellite communications system (e.g., servicing a particular spot beam coverage area), a particular carrier frequency band and/or polarization within a spot beam of a satellite communications system (e.g., servicing some or all terminals in a particular spot beam coverage area), a cellular carrier frequency band (e.g., servicing cellular terminals in a particular cell coverage area), etc. For example, a communication with a particular carrier can involve communicating over a respective wireless link using a particular frequency, polarization, etc. The communications system architecture can use multiple carriers to provide various features, including servicing a large service area made up of multiple carrier coverage areas (e.g., spot beam coverage areas, cell coverage areas, etc.). Carrier coverage areas can partially or fully overlap, so that certain geographic regions are serviced (e.g., concurrently) by multiple carriers. As the transport craft 110 moves through the communications network, it can move through multiple carrier coverage areas, so that communications services can be provided to the transport craft 110 via different carriers over time. For example, during a transatlantic or international airplane flight, an airplane, and the content consumption devices 120 of passengers on the airplane, may move through a number of carrier coverage areas; and the different carriers servicing those coverage areas can be used over time to maintain communications with the transport craft 110 over a large geographic region covered during transport (e.g., the traversed region is larger than a single carrier coverage area), and/or to provide other features, such as facilitating load balancing across multiple carriers, grouping of terminals by carrier, etc. Moving a transport craft 110 from one carrier to another carrier during transport can involve "handover" of communications services between those carriers, which can involve handing over pending multicast communications and/or other services in some cases.

Use of the in-transit communications services by passengers of the transport craft 110 can involve communication of various types of content over the provider network. For example, the content can include media content streaming (e.g., over-the-top television, movie, or radio programming); live television or radio viewing; Internet browsing, social media, or online gaming interactions; emailing, texting, or other messaging interactions; etc. Such content can originate from, and/or be destined for, the content server(s) 180 via the content network 160 and gateway 150 (and/or other provider-side network nodes 245). The content network 160 can include any suitable type of network, such as the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication as described herein. The network 160 can include both wired and wireless connections as well as optical links.

The content server(s) 180 can be accessible via the satellite 105 in any suitable architecture. For example, content can be generated by the content server(s) 180, stored at the content server(s) 180, and/or received by the content server(s) 180 via network 160; and the content server(s) 180 may be located at the gateway 150, core node, or any other suitable location of the communications infrastructure. The content can be communicated from the content server(s) 180 to the content consumption devices 120 (e.g., in response to requests for such media from the content consumption devices 120), while in flight, via the satellite 105 and the on-board communication system 112. Although only one content server 180 is shown to avoid over complication of the drawing, the content received by the content consumption devices 120 may be from one or more content server(s) 180 in one or more locations. In some cases, provision of the in-transit communications services involves providing content in response to requests (e.g., explicit or implicit requests) for such content from the content consumption devices 120. In other cases, provision of the in-transit communications services involves pushing the content to the transport craft 110 and/or to particular content consumption devices 120 not in response to a client request. For example, content can be pushed to content consumption devices 120 based on a schedule or for pre-positioning purposes, content can be broadcast or multicast to the transport craft 110 using any suitable communications protocols and/or schema, etc.

Provision of the in-transit communications services to the transport craft 110 can involve interactions between the provider-side components of the network and the on-board communication system 112 (e.g., via one or more satellite communications links 135 and the satellite 105). Embodiments of the on-board communication system 112 include the in-transit terminal 230, and the in-transit terminal 230 can include an antenna system 170, transceiver 172, modem 174, network access unit (NAU) 176, and wireless access point (WAP) 178. In some implementations, the on-board communication system 112 can provide for reception of a forward downlink signal from the satellite 105 and transmission of a return uplink signal to the satellite 105 to support two-way data communications between content consumption devices 120 within the transport craft 110 and provider-side components of the provider network. The content consumption devices 120 can include mobile devices (e.g., smartphones, laptops, tablets, netbooks, and the like), such as personal electronic devices (PEDs) brought onto the transport craft 110 by passengers. As further examples, the content consumption devices 120 can include passenger seat back systems, or other devices on the transport craft 110. The content consumption devices 120 can communicate with the network access unit 176 via a communication link that can be wired and/or wireless. The communication link can be, for example, part of a local area network such as a wireless local area network (WLAN) supported by WAP 178. One or more WAPs 178 can be distributed about the transport craft 110, and can, in conjunction with network access unit 176, provide traffic switching and routing functionality; for example, as part of a WLAN extended service set (ESS), etc.

In operation, the network access unit 176 can provide uplink data received from the content consumption devices 120 to the modem 174 to generate modulated uplink data (e.g., a transmit intermediate frequency (IF) signal) for delivery to the transceiver 172. The transceiver 172 can upconvert and then amplify the modulated uplink data to generate the return uplink signal for transmission to the satellite 105 via the antenna system 170. Similarly, the transceiver 172 can receive the forward downlink signal from the satellite 105 via the antenna system 170. The transceiver 172 can amplify and downconvert the forward downlink signal to generate modulated downlink data (e.g., a receive IF signal) for demodulation by the modem 174. The demodulated downlink data from the modem 174 can be provided to the network access unit 176 for routing to the content consumption devices 120. The modem 174 can be integrated with the network access unit 176, or can be a separate component in some examples.

As the transport craft 110 moves through carriers of the communications system 100, passengers on-board those transport craft 110 can consume in-transit communications services using their content consumption devices 120. Some embodiments described herein seek to ensure at least a desired level of QoE to those passengers consuming, or seeking to consume, the in-transit communications services. This can involve using various components across the provider network to obtain and exploit both objective and subjective QoE-related information for passengers of the transport craft 110.

Figure 2:
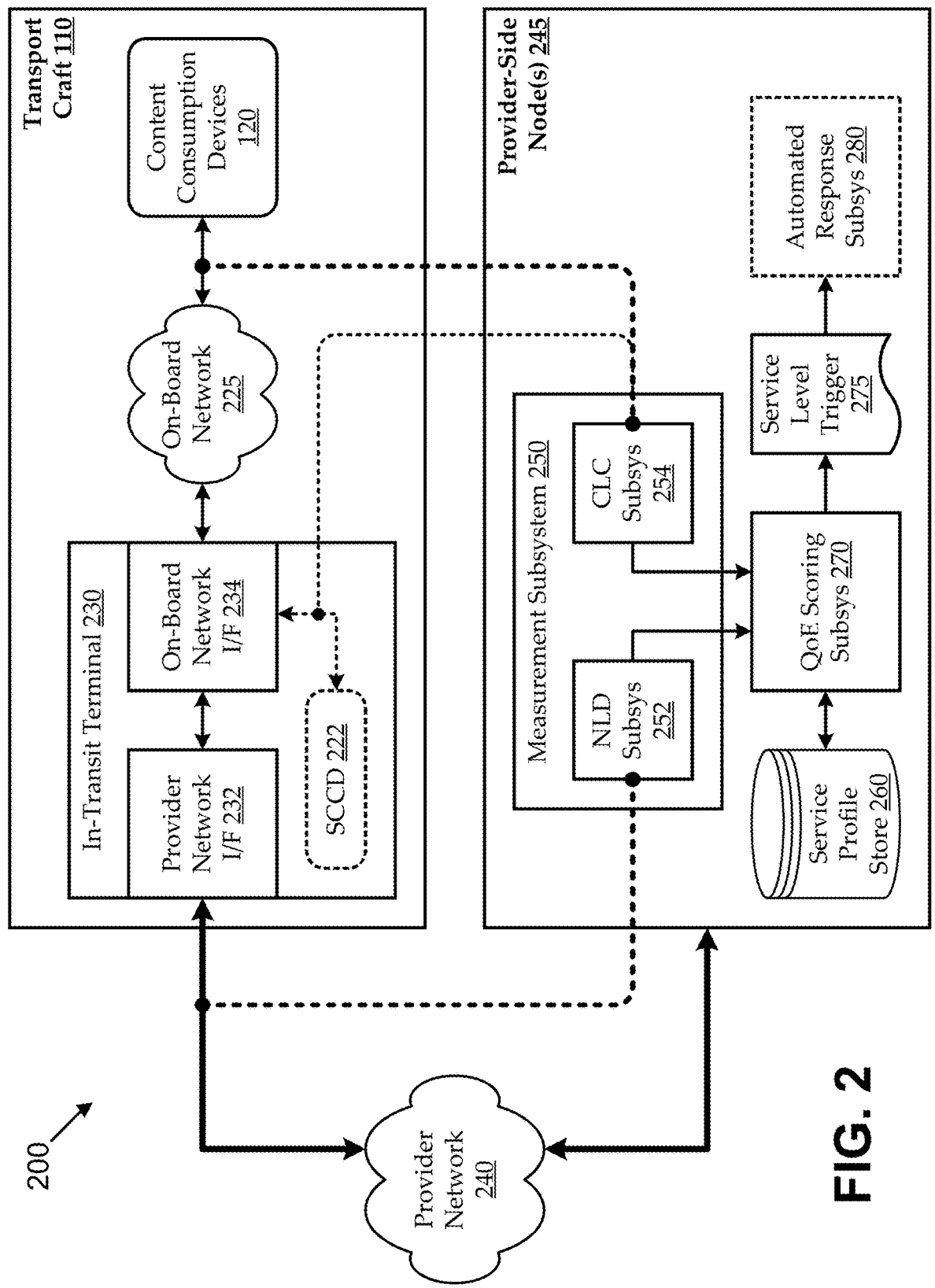
FIG. 2 shows an illustrative communications system for delivering in-transport communications services in which measurement and scoring components are primarily disposed in provider-side network nodes, according to various embodiments.

FIG. 2 shows an illustrative communications system 200 for delivering in-transport communications services in a manner that supports a desired passenger QoE, according to various embodiments. The communications system 200 can be an implementation of portions of the communications system 100 described with reference to FIG. 1. For example, as in FIG. 1, the communications system 200 of FIG. 2 includes one or more transport craft 110 in communication with one or more provider-side network nodes 245 via a provider network 240. The provider network 240 can include the satellite communications network depicted in FIG. 1, or any other suitable network or networks.

The transport craft 110 can have, disposed thereon, an in-transit terminal 230 in communication with multiple content consumption devices 120 via an on-board network 225. Embodiments of the in-transit terminal 230 can include a provider network interface 232 to communicatively couple with the provider network 240 over which the in-transit communications services are provided to the transport craft 110. Embodiments of the in-transit terminal 230 can also include an on-board network interface 234 to communicatively couple with the content consumption devices 120 via the on-board network 225.

In the illustrated embodiment, the provider-side network nodes 245 includes a measurement subsystem 250, a QoE scoring subsystem 270, and a service profile store 260 having service level data stored thereon (as described below). Embodiments of the measurement subsystem 250 include a network-level delivery (NLD) subsystem 252 to measure delivery of the in-transit communications services during a measurement time window to obtain a set of NLD measurements. In some embodiments, the set of NLD measurements includes a measurement of availability of the in-transit communications services in the measurement time window. In one implementation, the NLD subsystem 252 repeatedly (e.g., periodically) pings the communications network to determine whether the connection is live, and records results of the pings over the measurement time window to obtain a measurement of availability. In another implementation, the NLD subsystem 252 periodically or continuously measures data rate of one or more links of the communications network to determine if any request or response data is traversing the link(s). Any periods during which no data is traversing the link(s) can be recorded as periods of no availability, and the NLD subsystem 252 can obtain a measurement of availability, accordingly. In other embodiments, the set of NLD measurements includes a measurement of data rate of the in-transit communications services in the measurement time window. In other embodiments, the set of NLD measurements includes a link metric measurement for at least one communications link between a provider-side node of the communications network and the transport craft. For example, the link metric can indicate a link latency, bandwidth, handover status, and/or any other suitable link metric. Any of these and/or other types of NLD measurements can include measurements of forward-link performance (NLD measurements relating to forward-link traffic traversing links of the communications network) and/or measurements of return-link performance (NLD measurements relating to return-link traffic traversing links of the communications network). As used herein, forward-link communications generally refer to communications sent to the transport craft 110, while return-link communications generally refer to communications sent from the transport craft 110. For example, forward-link communications can be sent from the provider-side node(s) 245 to the transport craft 110 (or, referring to FIG. 1, over one or more satellite communications links 135 from a gateway 150 to one or more transport craft 110); and return-link communications can be sent from the transport craft 110 to the provider-side node(s) 245 (or, referring to FIG. 1, over one or more satellite communications links 135 from a transport craft 110 to a gateway 150).

The NLD subsystem 252 can obtain the NLD measurements in any suitable manner. For example, the measurement subsystem 250 can run speed tests and/or other network tests to check whether the network is available and is providing a particular data rate. Locating the NLD subsystem 252 at the provider-side network nodes 245 can facilitate obtaining and/or aggregating measurements from across multiple transport craft 110. For example, the NLD measurements can be aggregated per transport craft, per carrier and/or beam, per fleet, per transport craft type, per transport route, per passenger type, per content consumption device type, per content consumption application type, per class of service, per geography, per time (e.g., time of day, time of year), per transport craft capacity, etc. In some implementations, the aggregation can be multi-dimensional. For example, NLD measurements can be aggregated per carrier per transport craft type.

Embodiments of the measurement subsystem 250 also include a customer-level consumption (CLC) subsystem 254 to measure consumption of the in-transit communications services in the measurement time window by at least one of the content consumption devices 120 to obtain a set of CLC measurements. In some embodiments, some or all of the NLD measurements are objective measurements, and some or all of the CLC measurements are subjective measurements. In some embodiments, one or more of the subjective CLC measurements is obtained by communicating a prompt to one or more passengers via their one or more content consumption devices 120 to request subjective feedback data from the passenger(s) regarding the consumption of the in-transit communications services in the measurement time window. For example, the prompt can be communicated while the passenger(s) is using the content consumption device(s) 120 to consume in-transit communications services, or sometime thereafter. In one such embodiment, consumption of the in-transit media services is via a dedicated application (e.g., provided by the transport craft provider, by the communications provider, etc.), or via a standard application (e.g., a standard Internet browser); and the application includes graphical user interface elements, pop-ups, or the like, by which prompts can be displayed during login to services, interactions with services, responsive to detecting certain conditions during consumption of services, etc. The subjective feedback data can be received from the at least one of the one or more passengers via the at least one content consumption device responsive to the prompt, and at least a portion of the CLC measurements can be generated according to the subjective feedback data.

The CLC subsystem 254 can additionally or alternatively obtain one or more objective CLC measurements in any suitable manner. For example, the CLC subsystem 254 can include, or be in communication with, a provider-side deep packet inspection engine, a traffic shaper, etc. (e.g., and/or one or more simulated content consumption devices (SCCDs) 222, as described below). Such components can monitor traffic communicated to and from the transport craft 110 and/or individual content consumption devices 120 to determine what types of content are being consumed, how much of each type of content is being consumed, which applications or application types are being used to consume content, etc. As with the NLD subsystem 252, locating the CLC subsystem 254 at the provider-side network nodes 245 can facilitate obtaining and/or aggregating measurements from across multiple transport craft 110. The CLC measurements can be aggregated in the same or different ways (e.g., at higher or lower resolution, across the same or different variables, etc.) as the aggregation of the NLD measurements. For example, some implementations can aggregate the CLC measurements by communication protocol type, application type, browser type, etc.

In one implementation, the set of CLC measurements indicates an amount of data of the in-transit communications services used (e.g., including upload and/or download usage) by one or more content consumption devices 120 in the measurement time window. In another implementation, the set of CLC measurements indicates an amount of time the one or more content consumption devices 120 used the in-transit communications services in the measurement time window. In another implementation, the set of CLC measurements indicates at least one device type used to consume the in-transit communications services by the one or more content consumption devices 120 in the measurement time window (e.g., device format, such as smart phone, laptop, tablet, etc.; device installation, such as personal mobile device, seatback terminal, shared cabin display, etc.; device characteristic, such as screen size, operating system, etc.). In another implementation, the set of CLC measurements indicates at least one content consumption application used to consume the in-transit communications services by the one or more content consumption devices 120 in the measurement time window (e.g., over-the-top media streaming, Internet chat, Internet browsing, email, etc.). In another implementation, the set of CLC measurements indicates a traffic type involved in consuming the in-transit communications services by the one or more content consumption devices 120 in the measurement time window. In another implementation, the set of CLC measurements indicates whether at least one of the passengers associated with the one or more content consumption devices 120 successfully purchased consumption of the in-transit communications services in association with the measurement time window. In another implementation, the set of CLC measurements indicates whether the one or more content consumption devices 120 successfully communicatively coupled with the in-transit terminal 230 to consume the in-transit communications services in association with the measurement time window.

In some embodiments, some of the CLC measurements can be affected by use of one or more simulated content consumption devices (SCCDs) 222. Each SCCD 222 can be implemented as an executable program running on the in-transit server 230 that simulates behavior of one or more actual content consumption devices 120. Alternatively, one or more SCCDs 222 can be implemented as an actual or virtual machine running a simulation program. A SCCD 222 can be used, for example, to simulate normal consumer behavior, atypical consumer behavior, particular failure modes of content consumption devices, peculiarities of particular types of content consumption devices (e.g., brands, browsers, operating systems, software updates, etc.), peculiarities of particular use cases (e.g., types of apps, types of content, etc.), and/or other conditions.

In some implementations, the SCCDs 222 are used to generate metrics relating to web browsing (e.g., webpage load times, etc.), thereby contributing to computing a web browsing QoE score. For example, a SCCD 222 executable program can include a predefined set of one or more web pages to be requested by the SCCD 222. Repeatedly executing the program (e.g., at different times) can cause the SCCD 222 to request the same predefined set of one or more web pages each time, thereby obtaining multiple measurement samples for the web page load times over time. The measurement samples can be used (e.g., automatically) to define an acceptable web page load time (or acceptable range of web page load times), and to detect samples that do not comply (indicating unacceptable web page load times). In one such implementation, the SCCD 222 records web page load times over the course of a number of iterations and/or over time, automatically characterizes the recorded web page load times to define an acceptable web page load time, and uses the defined acceptable web page load time to detect anomalies in the recorded web page load times and/or in subsequently recorded web page load times. In another such implementation, the SCCD 222 records web page load times over the course of a number of iterations and/or over time and sends the recorded web page load times to the CLC subsystem 254. The CLC subsystem 254 can automatically characterize the recorded web page load times to define an acceptable web page load time and use the defined acceptable web page load time to detect anomalies in the recorded web page load times and/or in subsequently recorded web page load times.

In some implementations, the SCCDs 222 are used to generate metrics relating to video streaming (e.g., video startup delays, video rebuffering, etc.), thereby contributing to computing a video streaming QoE score. For example, a SCCD 222 executable program can include a predefined set of one or more video files to be requested by the SCCD 222. Repeatedly executing the program (e.g., at different times) can cause the SCCD 222 to request the same predefined set of one or more video files each time (e.g., from a provider-side node 245), thereby obtaining multiple measurement samples for the video startup delays. The measurement samples can be used (e.g., automatically) to define acceptable video startup delays, and to detect samples that do not comply (indicating unacceptable video startup delay). Similarly, while using the SCCD 222 to stream a video file, the number of rebuffering events can be counted over a certain period of time (e.g., 5 minutes), and the number can be used to establish an acceptable threshold number, and/or the number can be compared to an existing threshold number to indicate to detect an unacceptable number of rebuffering events.

Other embodiments can use the SCCDs 222 to generate any other suitable metrics to contribute to computing a general QoE score and/or various QoE scores relating to particular types of activities. In some of these and/or other implementations, CLC measurements obtained using the SCCDs 222 can be combined with NLD measurements (e.g., availability of in-transit communications services, forward-link data rate for in-transit communications services, etc.) to further contribute to computing one or more QoE scores. For example, while the measurement subsystem 250 is obtaining NLD measurements and CLC measurements, one or more SCCDs 222 can be running on the in-transit terminal 230 to simulate generation and/or consumption of various types of traffic (e.g., thereby impacting, and/or further contributing to the measurement of, the CLC measurements). This can be performed while a transport craft 110 is in normal transit (e.g., during a measurement time window while transporting passengers), while the transport craft 110 is in simulated transit (e.g., while the transport craft 110 is parked, or the like, and is being tested), or at any other suitable time.

The in-transit communications services are provided to passengers via their content consumption devices 120 (and/or to SCCDs 222) during some or all of a transit time of the transport craft 110. Similarly, the measurement time window over which the NLD and/or CLC measurements are obtained can be some or all of the transit time of the transport craft 110. For example, an airplane passenger may not be permitted to access in-transit communications services during takeoff or landing, or during other portions of a flight; while a bus passenger may be permitted to access in-transit communications services for the entire time the passenger is on board the bus. Accordingly, some implementations set the measurement time window in accordance with the portion of the transit time of the transport craft 110 during which passengers are permitted to access in-transit communications services. Further, there may be certain times during the transit of a transport craft 110 at which more or fewer passengers are likely to be using in-transit communications services, at which in-transit communications services are likely to be more or less reliably delivered to the transport craft 110, etc. Accordingly, some implementations set the measurement time window to correspond to such times at which certain failure modes or other conditions are likely to occur. In other implementations, the measurement time window is set to record a sample of activity for a predetermined amount of time. For example, the measurement time window can be set to a ten minute window approximately halfway through the transit time of the transport craft. In other implementations, the measurement time window can be set in response to a trigger event. For example, implementations can automatically be triggered to measure with respect to one or more transport craft 110 for an amount of time in response to an explicit measurement request (e.g., issued contractually based on a schedule, issued by a service technician, etc.), in response to a detected network event that could impact QoE (e.g., a network outage, a detected surge in network usage, etc.), in response to a detected indication of reduced QoE (e.g., a detected reduction in QoE for one or more passengers of a transport craft 110 can trigger measurement of QoE for other passengers of that transport craft 110, other transport craft 110 serviced by the same carrier, etc.), and/or in response to any other suitable trigger event.

Embodiments of the QoE scoring subsystem 270 are in communication with the measurement subsystem 250 to compute a QoE score associated with a particular measurement time window as a function of the NLD measurements and the CLC measurements. The QoE score can indicate a delivered quality of service (QoS) as perceived by one or more passengers of one or more transport craft 110 relating to those passengers' consumption (or lack of consumption) of the in-transit communications services via their content consumption devices 120. After computing the QoE score, embodiments of the QoE scoring subsystem 270 can update the service level data stored in the service profile store 260, accordingly. In some embodiments, updating the service profile store 260 involves storing new data and/or overwriting data in the service profile store 260. In other embodiments, the updating can involve computing updated statistics, metrics, trends, and/or other data in accordance with the updated service level data, and storing those updates in the service profile store 260.

In the event that updating the service profile store 260 causes some portion of the service level data to cross a predefined trigger threshold (e.g., to exceed a maximum threshold level, or to drop below a minimum threshold level), the QoE scoring subsystem 270 can output a service level trigger 275. In some embodiments, the service level trigger 275 can indicate one or more predetermined undesirable conditions with respect to QoE for one or more passengers of the transport craft 110. In other embodiments, the service level trigger 275 can indicate one or more exceptionally desirable conditions with respect to QoE for one or more passengers of the transport craft (e.g., in excess of a contracted or guaranteed QoE level).

The QoE scoring subsystem 270 can compute the QoE score in any suitable manner as a function of the NLD measurements and the CLC measurements. In some embodiments, the computing is based on number of predetermined factors each having a corresponding weighting. The weightings and/or function used in the computation can depend on the type of service level trigger 275 to be output by the QoE scoring subsystem 270. The computing can be performed at any suitable resolution or resolutions, such that the computing can involve aggregating, interpolating, extrapolating, associating, etc. For example, the computing can result in one or more QoE scores associated with a particular transport craft, a particular customer or group of customers, a particular device type, a particular application or data type, a particular service class, a particular transport route, etc. In some embodiments, the in-transit communications services are delivered to the transport craft in accordance with a set of contractual QoE conditions indicating at least one target NLD level for the set of NLD measurements and at least one target CLC level for the set of CLC measurements. In such embodiments, the QoE scoring subsystem 270 can compute the QoE score further as a function of at least one of the set of contractual QoE conditions. For example, provision of the in-transit media services can be governed by a contract between the communications provider and the transport services provider, or between the communications provider and the passenger (e.g., per an end user license agreement, a terms of use agreement, a loyalty program agreement, etc.); and the contract can provide for promised, guaranteed, or other levels of service relating to QoE.

In some embodiments, the QoE scoring subsystem 270 computes the QoE score according to previously or dynamically generated expected QoE conditions. For example, embodiments can generate a set of expected QoE conditions for one or more transport craft 110, transport craft type, transport route, carrier, etc. In some implementations, some or all of the expected QoE conditions are generated manually, for example, in accordance with contractual obligations, normal operating expectations, etc. In other implementations, some or all of the expected QoE conditions are generated automatically by the QoE scoring subsystem 270 as a function of the service level data stored in the service profile store 260. For example, machine learning models, statistical models, trend analyses, or the like can be used to generate a band of values considered to be within a normal operating range for certain transport craft 110, times of day, passenger capacity, etc. The generated expected QoE conditions can indicate at least one of an expected NLD level for at least one of the set of NLD measurements or an expected CLC level for at least one of the set of CLC measurements. The QoE scoring subsystem 270 can then compute the QoE score in such a way that the QoE score indicates the delivered QoS as perceived by the one or more passengers of the transport craft as compared to the expected QoS.

In some embodiments, the service level trigger 275 generated by the QoE scoring subsystem 270 can be pre-associated with one or more automated trigger response actions. In such embodiments, the provider-side network nodes 245 can further include an automated response subsystem 280. The automated response subsystem 280 can detect the service level trigger 275, and can direct performance of the automated trigger response action responsive to the detecting. The automated trigger response action can include directing automated performance of a task to address an issue with the in-transit communications services indicated by the service level trigger 275. In one implementation, the task includes communicating a service call. For example, an automated service call can be issued to on-craft personnel (e.g., a flight attendant) to see whether the passenger's experience can be improved in some way (e.g., by resetting one or more components of the in-transit terminal, by guiding the customer through usage, etc.), issued to ground personnel (e.g., ground crew at a destination airport to inform them of a possible serviceable issue with the in-transport terminal), or issued to a communications provider (e.g., so they can log the issue, take remedial action, schedule service, etc.). In another implementation, the task includes executing a repair script. For example, automated repair scripts can be used automatically to reboot one or more portions of the in-transit terminal, to re-establish a network connection, to update software, to check for viruses or other software errors, to suggest remedial action (e.g., prompting the passenger to try a different browser or to download particular software), etc. In another implementation, the task includes adjusting subsequent provisioning of network resources. For example, bandwidth allocations, traffic shaping, and/or other provisioning can be adjusted for the affected transport craft in real-time; scheduled provisioning can be adjusted for future times when the affected transport craft will be in transport, future times when the same or another transport craft is scheduled to traverse the affected route, etc. In another implementation, the task includes issuing compensation to at least one of the one or more passengers impacted by the issue, or adjusting pricing for consumption of the in-transit communications services. For example, one or more affected passengers can automatically be given access to a higher service level at no or reduced cost, can automatically be issued rebates or discounts on communications or other services (e.g., Internet access on a future flight, a coupon for food or drink on a future flight, loyalty program credit, etc.), can automatically be refunded for used communications services, etc. In another implementation, the task includes generating a report for communication to a contract partner associated with delivery of the in-transit communications services. For example, a transit services provider can contract with a communications provider for delivery of in-transit communications services; and the contract can require the communications provider to inform the transit services provider of QoE-related metrics.

As described herein, QoE scores can be computed across various dimensions and at various resolutions. For example, a QoE score can be computed across any suitable combination of one or more passengers, one or more aircraft, one or more behavior types (e.g., web browsing, video streaming, etc.), one or more application types, and/or other dimensions. Depending on the types of QoE scores that are computed and/or the types of service level triggers 275 to be output, service level data can be updated in the service profile store 260 in various ways, and the function used to update the service level data can vary from embodiment to embodiment. In some embodiments, the service level data is updated in a manner that directly corresponds to particular QoE scores (e.g., each datum in a set of service level data in the service profile store 260 is a corresponding previously computed QoE score). For example, a QoE score computed across passengers of a particular aircraft over a measurement time window indicates that, although in-transit communications services appear (e.g., according to certain NLD measurements) to be available at a desirable data rate, passengers are having a poor experience (e.g., according to certain CLC measurements). In such an example, the service level data can be updated to reflect the computed QoE score and can cause an output of a particular service level trigger 275 that causes the in-transit terminal 230 automatically to reset.

In other cases, the service level data is updated in a manner that aggregates multiple QoE scores computed over the same or different measurement time windows. For example, over time, a respective QoE score is computed for each of multiple passengers on each of multiple aircraft over each of multiple measurement time windows. Updating the service level data can involve aggregating some or all of the respective QoE scores across one or more dimensions (e.g., by aggregating QoE scores for all passengers of a particular aircraft in a particular measurement time window, for one passenger over multiple measurement time windows, etc.) and/or at one or more resolutions (e.g., for all passengers of in a particular cabin of a particular aircraft, for all passengers of an entire aircraft, for all passengers across a fleet of aircraft, etc.). Further, each QoE score can be part of one or more aggregation (e.g., one aggregation includes all passengers in a particular aircraft in a particular measurement time window, and another aggregation includes some of the same passengers over multiple aircraft in multiple time windows). In some cases, the aggregation involves further processing and/or computation, such as by computing interpolations, extrapolations, or statistical trends; by filtering and/or sorting; by processing through a machine learning algorithm; etc. The aggregations reflected by the updated service level data can then be used to inform when many types of service level triggers 275 are output. For example, aggregating respective QoE scores of individual passengers can be used in a similar manner to computing a single QoE score for multiple passengers (e.g., in the example above where the service level trigger 275 that causes the in-transit terminal 230 automatically to reset). The aggregated service level data can be used to detect and address longer term and/or macroscopic QoE trends. For example, the service level data can indicate that passengers tend to experience a poor QoE when seated in the business class cabin of each of a particular model of aircraft in a large fleet, and such service level data can cause outputting of a service level trigger 275 that initiates a systematic review of the delivery of in-transit communications services to the business class cabins of the particular model of aircraft.

In the various embodiments described with reference to FIG. 2, components of the measurement subsystem 250 and the QoE scoring subsystem 270 are disposed in provider-side network nodes 245. Accordingly, these embodiments obtain NLD measurements and CLC measurements and compute QoE scores in the provider-side portion of the network remote from the transport craft 110. In other embodiments, various portions of the measurement and/or computation components can be disposed in other portions of the network, such as in the transport craft 110. Some of these other embodiments are illustrated in FIGS. 3 and 4.

Figure 3:
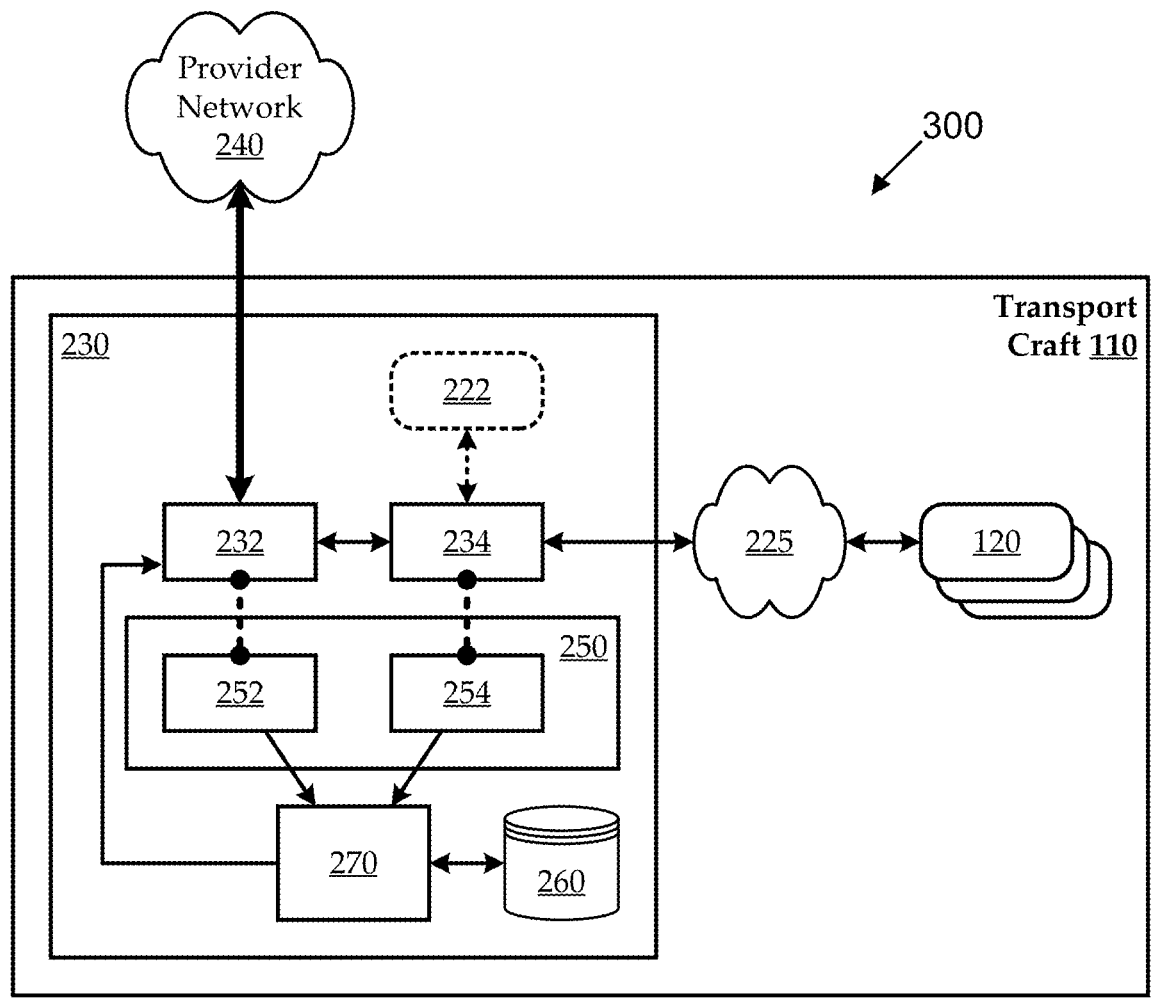
FIG. 3 shows an illustrative communications system for delivering in-transport communications services, in which measurement and scoring components are primarily disposed in transport craft, according to various embodiments.
Figure 4:
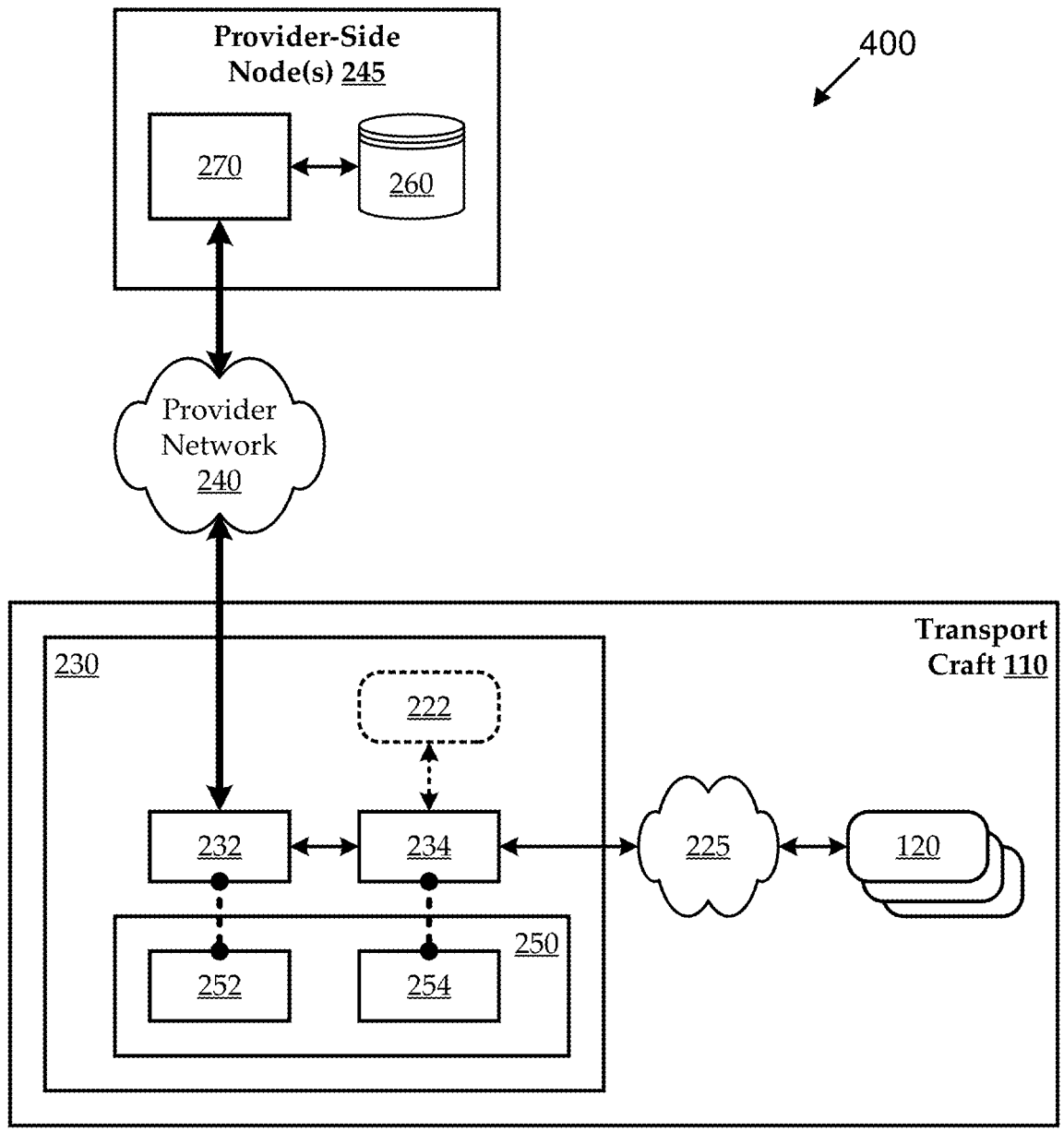
FIG. 4 shows an illustrative communications system for delivering in-transport communications services, in which measurement components are primarily disposed in transport craft and scoring components are primarily disposed in provider-side network nodes, according to various embodiments.

FIG. 3 shows an illustrative communications system 300 for delivering in-transport communications services in a manner that supports a desired passenger QoE, in which components of the system 300 are primarily disposed in individual transport craft 110, according to various embodiments. The communications system 300 can be an implementation of portions of the communications system 100 described with reference to FIG. 1. For example, the illustrated transport craft 110 can represent one of a number of transport craft 110 in communication with one or more provider-side network nodes 245 (not shown) via a provider network 240.

As in FIG. 2, the transport craft 110 includes an in-transit terminal 230 in communication with a number of content consumption devices 120 over an on-board network 225. Some embodiments can also include one or more SCCDs 222 that can be implemented by the in-transit terminal 230. The in-transit terminal 230 can include a provider network interface 232 to communicatively couple with the provider network 240 over which the in-transit communications services are provided to the transport craft 110, and an on-board network interface 234 to communicatively couple with the content consumption devices 120 via the on-board network 225. Unlike in FIG. 2, the in-transit terminal 230 of FIG. 3 includes the measurement subsystem 250, the QoE scoring subsystem 270, and the service profile store 260 (i.e., each in-transit terminal 230 disposed on each of the transport craft 110, or on a portion of the transport craft 110, can include a respective instance of the measurement subsystem 250, the QoE scoring subsystem 270, and the service profile store 260).

The measurement subsystem 250 on board the transport draft 110 includes the NLD subsystem 252 and the CLC subsystem 254. The NLD subsystem 252 can monitoring the provider network interface 232 to obtain NLD measurements for one or more network connections between the provider network 240 and the in-transit terminal 230. For example, the NLD measurements can include network availability, data rate, bandwidth, handover status, communication protocol, modulation and/or coding scheme, and/or any other suitable NLD measurements. The CLC subsystem 254 can include an on-board traffic shaper, on-board deep packet inspection engine, and/or other components to monitor the on-board network interface 234 to obtain CLC measurements of one or more network connections between the in-transit terminal 230 and the content consumption devices 120. For example, the CLC measurements can include how many content consumption devices 120 are consuming in-transit communications services, which types of content consumption devices 120 are being used to consume in-transit communications services (e.g., device categories, such as by screen size; and/or particular device types), which applications are being used to consume in-transit communications services (e.g., application categories, such as messaging, over-the-top media streaming, etc.; and/or particular applications), which types of traffic are traversing the on-board network 225 (e.g., data protocols, etc.), and/or any other suitable CLC measurements.

In the illustrated embodiment, the on-board QoE scoring subsystem 270 can then use the obtained NLD measurements and CLC measurements to compute a QoE score. For example, the QoE scoring subsystem 270 can update the service profile store 260 to determine whether to generate a service level trigger 275. In the event that a service level trigger 275 is generated by the QoE scoring subsystem 270, some embodiments can log the service level trigger 275. For example, the logged service level trigger 275 can be used for subsequent maintenance or subsequent remedial action. In other embodiments, the QoE scoring subsystem 270 can include components, or can be in communication with an on-board automated response subsystem 280 (not shown), to automatically take remedial action (e.g., by rebooting a connection, running diagnostic scripts, etc.).

FIG. 4 shows an illustrative communications system 400 that is similar to the system 300 of FIG. 3, except that the QoE scoring subsystem 270 and service profile store 260 are disposed in the provider-side network nodes 245. For example, as in FIG. 3 the transport craft 110 can represent one or multiple transport craft 110, each including an in-transit terminal 230 that is in communication with a provider network 240 (via a provider network interface 232) and is in communication with a number of content consumption devices 120 over an on-board network 225 (via an on-board network interface 234). Each in-transit terminal 230 can include an on-board measurement subsystem 250, which can include an NLD subsystem 252 and a CLC subsystem 254. Some embodiments can also include one or more SCCDs 222 that can be implemented by the in-transit terminal 230.

NLD measurements and CLC measurements obtained by the on-board measurement subsystems 250 of the multiple transport craft 110 can be communicated over the provider network 240 to the QoE scoring subsystem 270 (e.g., or to multiple QoE scoring subsystems 270). In the illustrated embodiment, the QoE scoring subsystem(s) 270 can use the obtained NLD measurements and CLC measurements to compute one or more QoE scores. For example, the QoE scores can be generated using measurements from a single transport craft 110 over a single measurement time window, aggregated from a single transport craft 110 over multiple measurement time windows, aggregated from multiple transport craft 110 in a single carrier over one or more measurement time windows, aggregated from multiple transport craft 110 in multiple carriers over one or more measurement time windows, etc. The received NLD and CLC measurements can be used to update the service profile store 260 to determine whether to generate a service level trigger 275. In the event that a service level trigger 275 is generated by the QoE scoring subsystem 270, embodiments can log the service level trigger 275 for use in taking future action, and/or can include components (e.g., an automated response subsystem 280, not shown) to automatically take remedial action.

Figure 5:
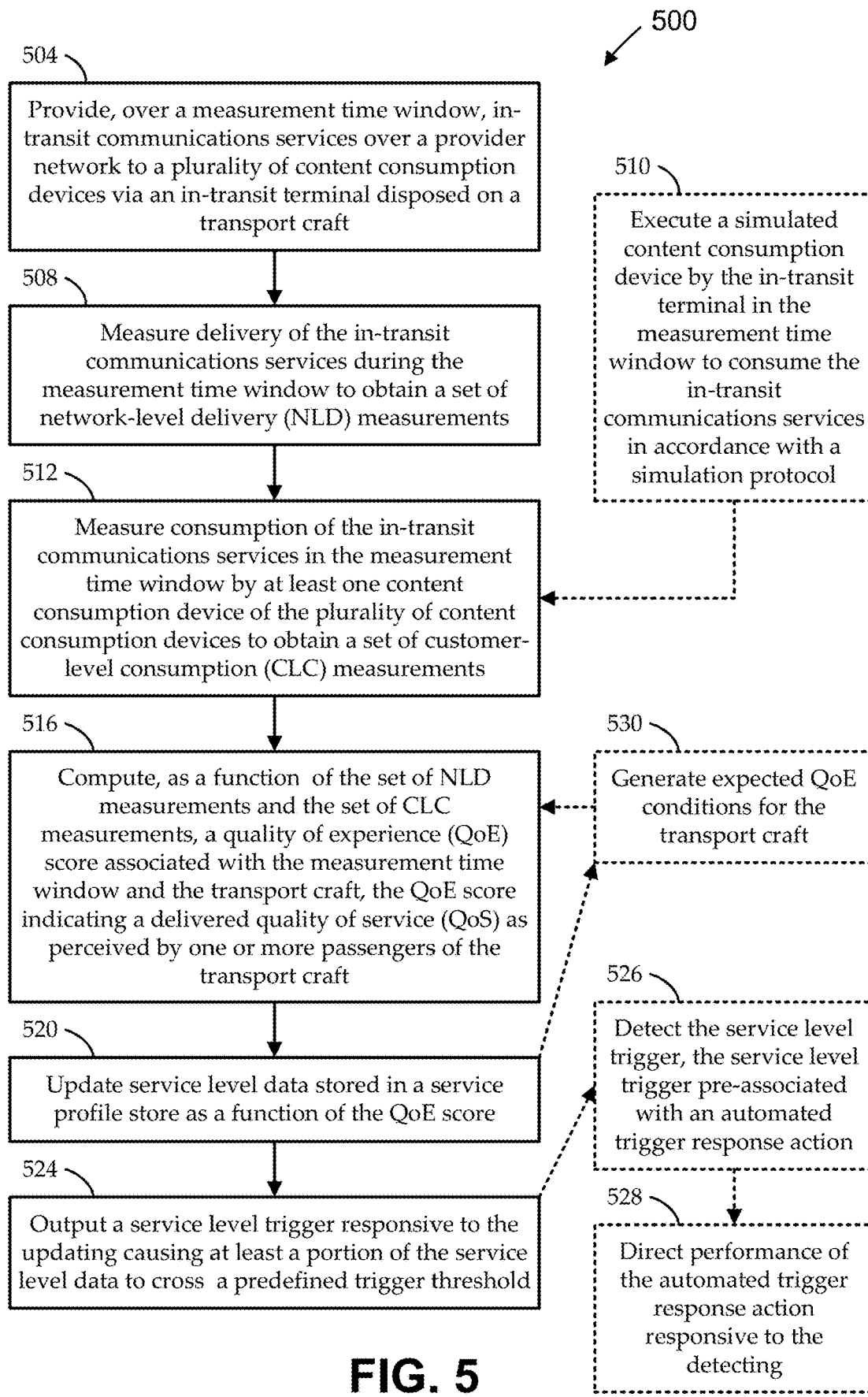
FIG. 5 shows a flow diagram of an illustrative method for delivering in-transport media services, according to various embodiments.

FIG. 5 shows a flow diagram of an illustrative method 500 for delivering in-transport media services, according to various embodiments. In some embodiments, the method 500 is implemented using various components of the systems described in FIGS. 1-4. Embodiments of the method 500 begin at stage 504 by providing, over a measurement time window, in-transit communications services over a provider network to content consumption devices via an in-transit terminal disposed on a transport craft. The in-transit communications services can include over-the-top or other streaming media services (e.g., movies, television, music, etc.); Internet browsing services (e.g., interaction with website content); personal communication services (e.g., email, texting, etc.); and/or any other suitable communications services delivered via a provider network. The provider network can include any suitable satellite or other wireless communications links for communicating between one or more provider-side network nodes and the in-transit terminal on the transport craft. The in-transit terminal can include any suitable communications hardware (e.g., transceivers, modems, servers, etc.) disposed on any suitable transport craft (e.g., airplane, cruise ship, train, bus, etc.). The content consumption devices can include craft-installed consumption devices (e.g., seat-back display terminals, shared display screens aboard a transport craft, etc.), personal consumption devices (e.g., passenger smart phones, tablet or laptop computers, etc.), or any other suitable content consumption devices.

The measurement time window can include some or all of the time over which in-transit communications are provided to passengers on the transport craft. In one implementation, the measurement time window includes an entire transport time of the transport craft. In another implementation, the measurement time window includes only a portion of the transport time of the transport craft during which consumption of in-transport communications services is permitted (e.g., a time during which a particular airplane flight is at an altitude above 10,000 feet). In another implementation, the measurement time window is some sample time (e.g., ten minutes) during the transport time of the transport craft.

At stage 508, embodiments can measure delivery of the in-transit communications services during the measurement time window to obtain a set of network-level delivery (NLD) measurements. In some embodiments, the set of NLD measurements includes a measurement of availability of the in-transit communications services in the measurement time window. In other embodiments, the set of NLD measurements includes a measurement of data rate of the in-transit communications services in the measurement time window. In other embodiments, the set of NLD measurements includes a link metric measurement for at least one communications link between a provider-side node of the communications network and the transport craft. For example, the link metric can indicate a link latency, bandwidth, handover status, and/or any other suitable link metric. Any of these and/or other types of NLD measurements can include measurements of forward-link performance (NLD measurements relating to forward-link traffic traversing links of the communications network) and/or measurements of return-link performance (NLD measurements relating to return-link traffic traversing links of the communications network). In some implementations, some or all of the measuring at stage 508 can be performed by the in-transit terminal. For example, the in-transit terminal can run speed tests and/or other network tests to check whether the network is available and is providing a particular data rate. In certain implementations, the measuring at stage 508 can include aggregating NLD data from multiple of the content consumption devices. For example, the NLD data can be aggregated per transport craft, per carrier and/or beam, per fleet, per transport craft type, per transport route, per passenger type, per device type, per app type, per class of service, per geography, per time (e.g., time of day, time of year), per transport craft capacity, etc. In some embodiments, the providing at stage 504 includes communicating the in-transit communications services over the provider network from a provider-side network node to the transport craft, and at least some of the measuring at stage 508 is performed by the provider-side network node. For example, a gateway terminal can detect link conditions, ping in-transit terminals of transport craft, etc.

At stage 512, embodiments can measure consumption of the in-transit communications services in the measurement time window by at least one of the content consumption devices to obtain a set of customer-level consumption (CLC) measurements. In some embodiments, the measuring at stage 512 can include communicating a prompt via the at least one content consumption device to at least one of the one or more passengers on the transport craft that is using the at least one content consumption device, the prompt requesting subjective feedback data from the at least one of the one or more passengers regarding the consumption of the in-transit communications services in the measurement time window by the at least one content consumption device. For example, consumption of the in-transit media services can be via a dedicated application (e.g., provided by the transport craft provider, by the communications provider, etc.), or via a standard application (e.g., a standard Internet browser); and the application includes graphical user interface elements, popups, or the like, by which prompts can be displayed during login to services, interactions with services, responsive to detecting certain conditions during consumption of services, etc. The subjective feedback data can be received from the at least one of the one or more passengers via the at least one content consumption device responsive to the prompt, and at least a portion of the CLC measurements can be generated according to the subjective feedback data. In some implementations, the measuring at stage 512 involves obtaining at least one of the set of CLC measurements by the in-transit terminal. For example, the in-transit terminal (e.g., a craft-side deep packet inspection engine, traffic shaper, etc.) can ping connected content consumption devices, aggregate feedback, check link status, etc. In some such implementations, simulated content consumption devices can be used for such measurements, as described herein. In other implementations, the providing at stage 504 includes communicating the in-transit communications services over the provider network from a provider-side network node to the transport craft, and at least some of the measuring at stage 512 is performed by the provider-side network node. For example, a component of a provider-side gateway node (e.g., a provider-side deep packet inspection engine, traffic shaper, etc.) can aggregate CLC data from multiple transport craft, over an entire carrier or beam, etc.

In one implementation, the set of CLC measurements indicates an amount of data of the in-transit communications services used (e.g., including upload and/or download usage) by the at least one content consumption device of the plurality of content consumption devices in the measurement time window. In another implementation, the set of CLC measurements indicates an amount of time the at least one content consumption device used the in-transit communications services in the measurement time window. In another implementation, the set of CLC measurements indicates at least one device type used to consume the in-transit communications services by the at least one content consumption device in the measurement time window (e.g., device format, such as smart phone, laptop, tablet, etc.; device installation, such as personal mobile device, seatback terminal, shared cabin display, etc.; device characteristic, such as screen size, operating system, etc.). In another implementation, the set of CLC measurements indicates at least one content consumption application used to consume the in-transit communications services by the at least one content consumption device in the measurement time window (e.g., over-the-top media streaming, Internet chat, Internet browsing, email, etc.). In another implementation, the set of CLC measurements indicates a traffic type involved in consuming the in-transit communications services by the at least one content consumption device in the measurement time window. In another implementation, the set of CLC measurements indicates whether at least one of the passengers associated with the at least one content consumption device successfully purchased consumption of the in-transit communications services in association with the measurement time window. In another implementation, the set of CLC measurements indicates whether the at least one content consumption device successfully communicatively coupled with the in-transit server to consume the in-transit communications services in association with the measurement time window.

In some embodiments, at stage 510, embodiments can execute a simulated content consumption device by the in-transit terminal in the measurement time window to consume the in-transit communications services in accordance with a simulation protocol. In such embodiments, the measuring at stage 512 can include measuring consumption of the in-transit communications services in the measurement time window by the simulated content consumption device to obtain at least a portion of the set of CLC measurements. The simulated content consumption device is an executable program running on the in-transit server that simulates behavior of one or more content consumption devices. Such a simulated content consumption device can be used to simulate normal consumer behavior, erratic consumer behavior, particular failure modes of content consumption devices, peculiarities of particular types of content consumption devices (e.g., brands, browsers, operating systems, software updates, etc.), peculiarities of particular use cases (e.g., types of apps, types of content, etc.), and/or other conditions.

At stage 516, embodiments can compute, as a function of the set of NLD measurements and the set of CLC measurements, a quality of experience (QoE) score associated with the measurement time window and the transport craft. As described herein, the QoE score indicates a delivered quality of service (QoS) as perceived by one or more passengers of the transport craft. The computing at stage 516 can be based on number of predetermined factors each having a corresponding weighting. The weightings and/or function used in the computation can depend on the type of trigger that will be output below in stage 524. The computing can be performed at any suitable resolution or resolutions, such that the computing can involve aggregating, interpolating, extrapolating, associating, etc. For example, the computing can result in one or more QoE scores associated with a particular transport craft, a particular customer or group of customers, a particular device type, a particular application or data type, a particular service class, a particular transport route, etc. In some embodiments, the in-transit communications services are delivered to the transport craft in accordance with a set of contractual QoE conditions indicating at least one target NLD level for the set of NLD measurements and at least one target CLC level for the set of CLC measurements. In such embodiments, the computing at stage 516 can be further as a function of at least one of the set of contractual QoE conditions. For example, provision of the in-transit media services in stage 504 can be governed by a contract between the communications provider and the transport services provider, or between the communications provider and the passenger (e.g., per an end user license agreement, a terms of use agreement, a loyalty program agreement, etc.); and the contract can provide for promised, guaranteed, or other levels of service relating to QoE.

At stage 520, embodiments can update service level data stored in a service profile store as a function of the QoE score. In some embodiments, the updating involves storing new data, and/or overwriting data in the service profile store. In other embodiments, the updating can involve computing updated statistics, metrics, trends, and/or other data in accordance with the updated service level data.

Some embodiments, at stage 530, generate expected QoE conditions for the transport craft, such that the computing is further as a function of the set of expected QoE conditions. For example, embodiments can generate as a function of the service level data stored in the service profile store, prior to the computing, a set of expected QoE conditions for the transport craft (e.g., for the particular transport craft, transport craft type, transport route, carrier, etc.) indicating at least one of an expected NLD level for at least one of the set of NLD measurements or an expected CLC level for at least one of the set of CLC measurements. In such cases, the computing at stage 516 is such that the QoE score further indicates the delivered QoS as perceived by the one or more passengers of the transport craft as compared to an expected QoS.

At stage 524, embodiments can output a service level trigger responsive to the updating causing at least a portion of the service level data to cross a predefined trigger threshold. For example, depending on the type of service level trigger, crossing a predefined trigger threshold can involve reaching a level that is above a predetermined maximum threshold, or below a predetermined minimum threshold, etc. In some embodiments, the service level trigger can indicate one or more predetermined undesirable conditions with respect to QoE for one or more passengers of the transport craft. In other embodiments, the service level trigger can indicate one or more exceptionally desirable conditions with respect to QoE for one or more passengers of the transport craft (e.g., in excess of a contracted or guaranteed QoE level). As described above, some embodiments collect subjective feedback data from passengers (e.g., via a dedicated application, or the like). In some embodiments, the subjective feedback data is used to calibrate one or more trigger thresholds. For example, subjective feedback data collected from a large number of passengers over time can indicate that certain types of service level triggers 275 are being output too frequently or too infrequently, indicating that the trigger threshold is set too high or too low; and the trigger threshold can be raised or lowered, accordingly.

Some embodiments, at stage 526, can detect the service level trigger output in stage 524. In such embodiments, the service level trigger can be pre-associated with an automated trigger response action. Some such embodiments, at stage 528, can direct performance of the automated trigger response action responsive to the detecting. The automated trigger response action can include directing automated performance of a task to address an issue with the in-transit communications services indicated by the service level trigger. In one implementation, the task includes communicating a service call. For example, an automated service call can be issued to on-craft personnel (e.g., a flight attendant) to see whether the passenger's experience can be improved in some way (e.g., by resetting one or more components of the in-transit terminal, by guiding the customer through usage, etc.), issued to ground personnel (e.g., ground crew at a destination airport to inform them of a possible serviceable issue with the in-transport terminal), or issued to a communications provider (e.g., so they can log the issue, take remedial action, schedule service, etc.). In another implementation, the task includes executing a repair script. For example, automated repair scripts can be used automatically to reboot one or more portions of the in-transit terminal, to re-establish a network connection, to update software, to check for viruses or other software errors, to suggest remedial action (e.g., prompting the passenger to try a different browser or to download particular software), etc. In another implementation, the task includes adjusting subsequent provisioning of network resources. For example, bandwidth allocations, traffic shaping, and/or other provisioning can be adjusted for the affected transport craft in real-time; scheduled provisioning can be adjusted for future times when the affected transport craft will be in transport, future times when the same or another transport craft is scheduled to traverse the affected route, etc. In another implementation, the task includes issuing compensation to at least one of the one or more passengers impacted by the issue, or adjusting pricing for consumption of the in-transit communications services. For example, one or more affected passengers can automatically be given access to a higher service level at no or reduced cost, can automatically be issued rebates or discounts on communications or other services (e.g., Internet access on a future flight, a coupon for food or drink on a future flight, loyalty program credit, etc.), can automatically be refunded for used communications services, etc. In another implementation, the task includes generating a report for communication to a contract partner associated with delivery of the in-transit communications services. For example, a transit services provider can contract with a communications provider for delivery of in-transit communications services; and the contract can require the communications provider to inform the transit services provider of QoE-related metrics.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, or actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for delivering in-transport communications services, the method comprising:
   providing, over a measurement time window, in-transit communications services over a provider network to a plurality of content consumption devices via an in-transit terminal disposed on a transport craft;
   first measuring delivery of the in-transit communications services during the measurement time window to obtain a set of network-level delivery (NLD) measurements;
   executing a simulated content consumption device by the in-transit terminal in the measurement time window to consume the in-transit communications services in accordance with a simulation protocol;
   second measuring consumption of the in-transit communications services in the measurement time window by at least the simulated content consumption device to obtain a set of customer-level consumption (CLC) measurements;
   computing, as a function of the set of NLD measurements and the set of CLC measurements, a quality of experience (QoE) score associated with the measurement time window and the transport craft, the QoE score indicating a delivered quality of service (QoS) as perceived by one or more passengers of the transport craft;
   updating service level data stored in a service profile store as a function of the QoE score; and
   outputting a service level trigger responsive to the updating causing at least a portion of the service level data to cross a predefined trigger threshold.

2. The method of claim 1, further comprising:
   detecting the service level trigger, the service level trigger pre-associated with an automated trigger response action; and
   directing performance of the automated trigger response action responsive to the detecting.

3. The method of claim 2, wherein the automated trigger response action comprises directing automated performance, to address an issue with the in-transit communications services indicated by the service level trigger, of at least one of: communicating a service call; executing a repair script; adjusting subsequent provisioning of network resources; issuing compensation to at least one of the one or more passengers impacted by the issue; adjusting pricing for consumption of the in-transit communications services; or generating a report for communication to a contract partner associated with delivery of the in-transit communications services.

4. The method of claim 1, further comprising:
   generating, as a function of the service level data stored in the service profile store prior to the computing, a set of expected QoE conditions for the transport craft indicating at least one of an expected NLD level for at least one of the set of NLD measurements or an expected CLC level for at least one of the set of CLC measurements;
   wherein the computing is further as a function of the set of expected QoE conditions, such that the QoE score further indicates the delivered QoS as perceived by the one or more passengers of the transport craft as compared to an expected QoS.

5. The method of claim 1, wherein the set of CLC measurements indicate at least one of:
an amount of data of the in-transit communications services used by the at least one content consumption device of the plurality of content consumption devices in the measurement time window;
an amount of time the at least one content consumption device of the plurality of content consumption devices used the in-transit communications services in the measurement time window;
at least one device type used to consume the in-transit communications services by the at least one content consumption device of the plurality of content consumption devices in the measurement time window;
at least one content consumption application used to consume the in-transit communications services by the at least one content consumption device of the plurality of content consumption devices in the measurement time window;
a traffic type involved in consuming the in-transit communications services by the at least one content consumption device of the plurality of content consumption devices in the measurement time window;
whether at least one passenger of the one or more passengers associated with the at least one content consumption device of the plurality of content consumption devices successfully purchased consumption of the in-transit communications services in association with the measurement time window; or
whether the at least one content consumption device of the plurality of content consumption devices successfully communicatively coupled with the in-transit server to consume the in-transit communications services in association with the measurement time window.

6. The method of claim 1, wherein the second measuring comprises:
communicating a prompt via the at least one content consumption device to at least one of the one or more passengers on the transport craft that is using the at least one content consumption device, the prompt requesting subjective feedback data from the at least one of the one or more passengers regarding the consumption of the in-transit communications services in the measurement time window by the at least one content consumption device;
receiving the subjective feedback data from the at least one of the one or more passengers via the at least one content consumption device responsive to the prompt; and
generating at least a portion of the CLC measurements according to the subjective feedback data.

7. The method of claim 6, further comprising:
detecting, responsive to the subjective feedback data, a mismatch between when the subjective feedback data indicates to output the service level trigger and when the service level trigger is being output; and
updating the predefined trigger threshold to address the mismatch.

8. The method of claim 1, wherein the set of NLD measurements comprises a measurement of availability of the in-transit communications services in the measurement time window, and a measurement of data rate of the in-transit communications services in the measurement time window.

9. The method of claim 1, wherein the set of NLD measurements comprises a link metric measurement for at least one communications link between a provider-side node of the communications network and the transport craft.

10. The method of claim 1, wherein the service level trigger indicates one or more of a plurality of predetermined undesirable conditions with respect to quality of experience for one or more passengers of the transport craft.

11. The method of claim 1, wherein:
the in-transit communications services are delivered to the transport craft in accordance with a set of contractual QoE conditions indicating at least one target NLD level for the set of NLD measurements and at least one target CLC level for the set of CLC measurements; and
the computing is further as a function of at least one of the set of contractual QoE conditions.

12. The method of claim 1, wherein the second measuring comprises aggregating CLC data from multiple of the plurality of content consumption devices.

13. The method of claim 1, wherein the first measuring comprises obtaining at least one of the set of NLD measurements by the in-transit terminal.

14. The method of claim 1, wherein:
the providing comprises communicating the in-transit communications services over the provider network from a provider-side network node to the transport craft; and
the first measuring comprises obtaining at least one of the set of NLD measurements by the provider-side network node.

15. The method of claim 1, wherein the second measuring comprises obtaining at least one of the set of CLC measurements by the in-transit terminal.

16. The method of claim 1, wherein:
the providing comprises communicating the in-transit communications services over the provider network from a provider-side network node to the transport craft; and
the second measuring comprises obtaining at least one of the set of CLC measurements by the provider-side network node.

17. The method of claim 1, wherein the updating comprises computing updated service level data as a function of an aggregation of the QoE score and a plurality of previously computed QoE scores.

18. The method of claim 1, wherein the second measuring comprises measuring consumption of the in-transit communications services in the measurement time window further by at least one content consumption device of the plurality of content consumption devices to obtain at least a portion of the set of CLC measurements.

19. A system for delivering in-transport communications services, the system comprising:
an in-transit terminal disposed on a transport craft and comprising:
a provider network interface to communicatively couple with a provider network over which in-transit communications services are provided to the transport craft; and
an on-board network interface to communicatively couple with a plurality of content consumption devices disposed on the transport craft;
a set of one or more processors, and a processor-readable medium having instructions stored thereon, which, when executed, cause the set of one or more processors to instantiate a simulated content consumption device to consume the in-transit communications services in accordance with a simulation protocol;

a measurement subsystem comprising:
 a network-level delivery (NLD) subsystem to measure delivery of the in-transit communications services during a measurement time window to obtain a set of NLD measurements; and
 a customer-level consumption (CLC) subsystem to measure consumption of the in-transit communications services in the measurement time window by at least the simulated content consumption device to obtain a set of CLC measurements;

a service profile store having service level data stored thereon; and a quality of experience (QoE) scoring subsystem in communication with the measurement subsystem to:
 compute, as a function of the set of NLD measurements and the set of CLC measurements, a QoE score associated with the measurement time window and the transport craft, the QoE score indicating a delivered quality of service (QoS) as perceived by one or more passengers of the transport craft;
 update the service level data stored in the service profile store as a function of the QoE score; and
 output a service level trigger responsive to the updating causing at least a portion of the service level data to cross a predefined trigger threshold.

20. The system of claim 19, further comprising:
an automated response subsystem to:
 detect the service level trigger, the service level trigger pre-associated with an automated trigger response action; and
 direct performance of the automated trigger response action responsive to the detecting.

21. The system of claim 19, wherein the in-transit terminal comprises at least a portion of the measurement subsystem.

22. The system of claim 19, further comprising:
a provider-side node to communicate the in-transit communications services with the in-transit terminal over the provider network,
wherein the provider-side node comprises at least a portion of the measurement sub system.

23. The system of claim 19, wherein the at least one content consumption device of the plurality of content consumption devices comprises a passenger mobile terminal.

24. The system of claim 19, wherein the at least one content consumption device of the plurality of content consumption devices comprises a passenger fixed terminal.

25. The system of claim 19, wherein the provider network comprises a satellite communications network.

26. The system of claim 19, wherein the CLC subsystem is to measure consumption of the in-transit communications services in the measurement time window further by at least one content consumption device of the plurality of content consumption devices to obtain at least a portion of the set of CLC measurements.

27. A system for delivering in-transport communications services, the system comprising:

a set of processors; and
a non-transient data store having, stored thereon, service level data and processor-readable instructions, which when executed, cause the set of processors to perform steps comprising:
 first measuring delivery of in-transit communications services during a measurement time window to obtain a set of network-level delivery (NLD) measurements, the in-transit communications services provided over a provider network to a plurality of content consumption devices via an in-transit terminal disposed on a transport craft;
 executing a simulated content consumption device in the measurement time window to consume the in-transit communications services in accordance with a simulation protocol;
 second measuring consumption of the in-transit communications services in the measurement time window by at least the simulated content consumption device to obtain a set of customer-level consumption (CLC) measurements;
 computing, as a function of the set of NLD measurements and the set of CLC measurements, a quality of experience (QoE) score associated with the measurement time window and the transport craft, the QoE score indicating a delivered quality of service (QoS) as perceived by one or more passengers of the transport craft;
 updating the service level data as a function of the QoE score; and
 outputting a service level trigger responsive to the updating causing at least a portion of the service level data to cross a predefined trigger threshold.

28. The system of claim 27, wherein the steps further comprise:
 detecting the service level trigger, the service level trigger pre-associated with an automated trigger response action; and
 directing performance of the automated trigger response action responsive to the detecting.

29. The system of claim 27, wherein the steps further comprise:
 generating, as a function of the service level data stored in the non-transient data store, prior to the computing, a set of expected QoE conditions for the transport craft indicating at least one of an expected NLD level for at least one of the set of NLD measurements or an expected CLC level for at least one of the set of CLC measurements;
 wherein the computing is further as a function of the set of expected QoE conditions, such that the QoE score further indicates the delivered QoS as perceived by the one or more passengers of the transport craft as compared to an expected QoS.

30. The system of claim 27, wherein the second measuring comprises measuring consumption of the in-transit communications services in the measurement time window further by at least one content consumption device of the plurality of content consumption devices to obtain at least a portion of the set of CLC measurements.

* * * * *